(No Model.)　　　　　　　　　　　　　　　　2 Sheets—Sheet 1.
D. H. RICE.
CLUTCH FOR TRICYCLES.
No. 348,691.　　　　　　　　　Patented Sept. 7, 1886.
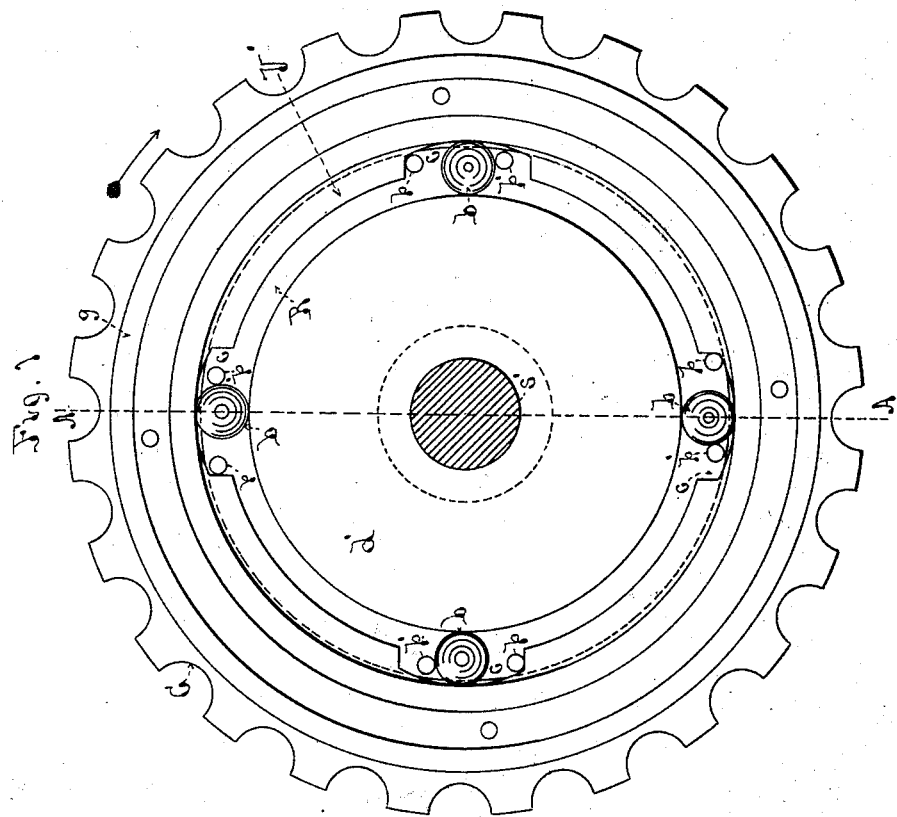
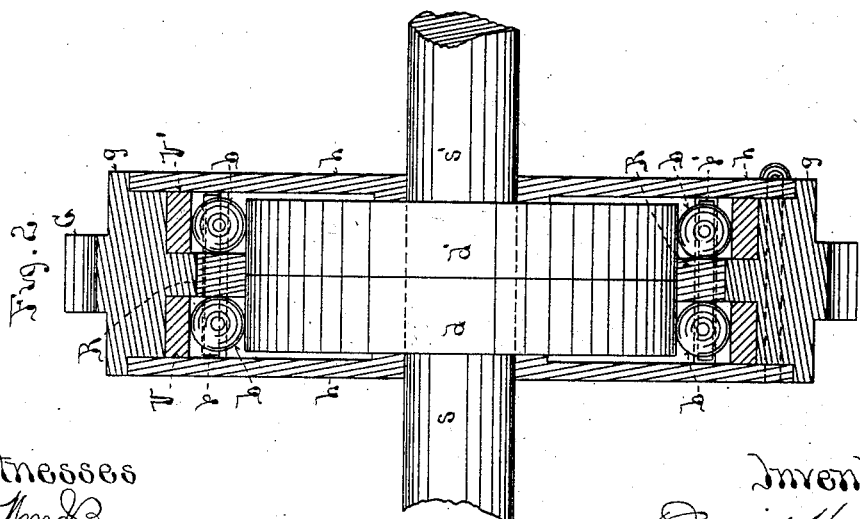
Witnesses　　　　　　　　　　　　　　Inventor
Wm. S. Brown　　　　　　　　　　　David Hall Rice
N. P. Ockington.
N. PETERS. Photo-Lithographer, Washington, D. C.

(No Model.) 2 Sheets—Sheet 2.
D. H. RICE.
CLUTCH FOR TRICYCLES.
No. 348,691. Patented Sept. 7, 1886.
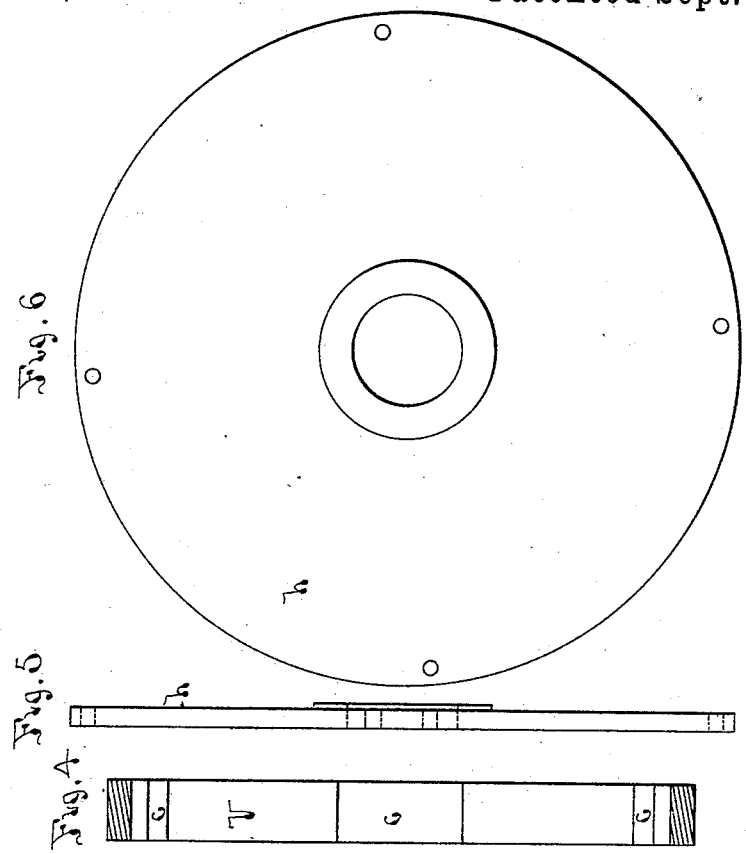
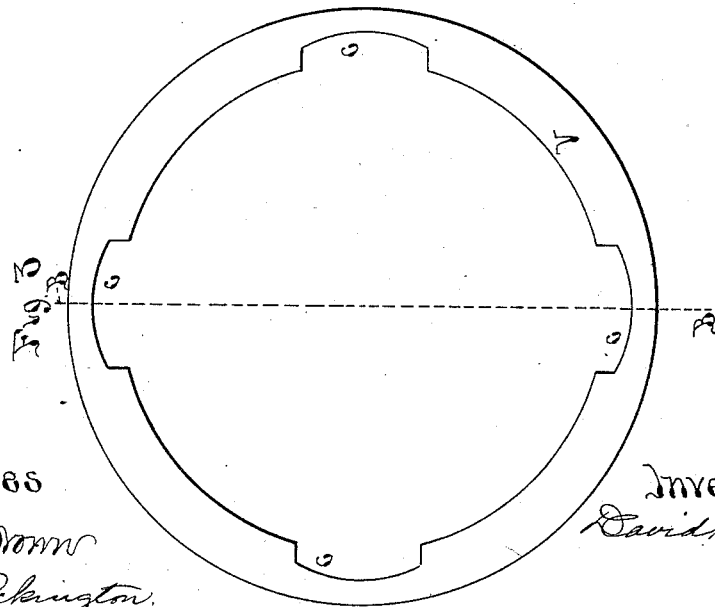
Witnesses
Wm. B. Brown
N. P. Ockington.
Inventor
David Hall Rice

UNITED STATES PATENT OFFICE.

DAVID HALL RICE, OF BROOKLINE, MASSACHUSETTS.

CLUTCH FOR TRICYCLES.

SPECIFICATION forming part of Letters Patent No. 348,691, dated September 7, 1886.

Application filed February 23, 1886. Serial No. 192,841. (No model.)

*To all whom it may concern:*

Be it known that I, DAVID HALL RICE, of Brookline, in the county of Norfolk and State of Massachusetts, have invented a new and useful Improvement in Clutches for Tricycles, of which the following is a specification.

My invention relates to clutches for tricycles and other similar machines; and it consists in certain novel arrangements and combinations of the several parts of the same, substantially as hereinafter described and claimed.

In the drawings, Figure 1 is a side view of my improved clutch with one of the side casing-plates removed to exhibit its internal construction. Fig. 2 is a transverse central section of the clutch, on the line A A of Fig. 1. Fig. 3 is a side view of one of the hardened rings detached which form bearings for the friction-balls which are the gripping agents. Fig. 4 is a section of the same on the line B B of Fig. 3. Fig. 5 is an edge view of one of the incasing-plates of the clutch, and Fig. 6 is a face view of the same.

My improvement is designed to form a friction-clutch as distinguished from a pawl-clutch, so organized that when applied to the two adjacent ends of a divided shaft the gear or pulley of the clutch will drive both members of the shaft positively and equally in either direction, but when either member of the shaft races or runs ahead of the driven pulley it is free to do so, as hereinafter described. This construction allows the clutch to be applied to the divided shaft of a tricycle, for instance, and to drive both wheels positively while allowing one of the wheels to race ahead of the other in turning corners, &c., and to have its shaft again seized and driven by the clutch instantly when the corner is turned with a friction-grip and without backlash.

G is the outer gear of the clutch by which it is driven from any suitable driving-gear and chain strap in the usual manner. This gear is formed on the outside of the ring $g$ which forms the outer band of the clutch. The side plates of the clutch $h\ h$ are bolted to the ring $g$ and have holes through their centers which form bearings on which they and ring $g$ revolve on the divided shaft $s\ s'$. This shaft is divided in the middle of the clutch and has the tricycle-wheels mounted on the outer ends, which are well understood and need no further description. The divided shaft is supported and revolves in suitable boxes or bearings, (not shown in the drawings,) in the usual manner. On the inner and adjacent ends of the parts $s$ $s'$ of the shaft are attached disks $d\ d'$, disk $d$ being on the end of part $s$, and $d'$ on $s'$.

In the inner periphery of ring $g$ are made at intervals around and opposite to the edges of the disks $d\ d'$, certain slots or notches $c\ c$, having their bottom faces forming double inclined surfaces from the center inward toward the disks $d\ d'$—that is, the part of each slot $c$ most distant from the disk opposite will be the center of the bottom of the slot, and its bottom surface inclines inward each way from this center toward the disk. This forms, with the outer surface of disk $d$ or $d'$, a space between it and the bottom surface of the slot in the form of a double wedge, into which, if a ball of suitable size is dropped in either direction, it will clutch the ring $g$ to the disk, and bind them together so long as the motion of the ring $g$ around the disk tends to hold the ball in that position. By means of this double-wedge shape of the opposite surfaces of the ring $g$ and disk $d$ or $d'$, a single ball, $b\ b$, in each of the slots $c\ c$ is made to clutch the ring to the disk in either direction, or, in other words, when the ring is moved around the disk in either direction. If, however, the slots $c\ c$ were so made that part of them formed wedging-surfaces in only one direction and part in the other direction about disks $d\ d'$, the same effect would be produced, except that each ball would only clutch the disk to the ring in one direction instead of both, and in this case the governor-ring would only have one pin, $p$, on the wedging side of the space in slot $c$ instead of two pins on two wedging sides, as hereinafter described; but such construction would still be within the spirit of my invention.

Heretofore in describing the slots $c\ c$, I have considered them as formed in the ring $g$ directly, for the sake of clearness in the description, and they may be so formed and perform the same functions as if in separate pieces of metal, because they must always travel with ring $g$. As it is evident, however, that the wedging surfaces of the slot $c\ c$ must be subjected to considerable wear from the clutching action of the balls against them, I have constructed the slots in separate rings V V', which are of hardened steel, and let them into the inner periphery of ring $g$ by a counterbore on each side in such a manner that when the face pieces are bolted in place they will clamp the rings V V' solidly to ring $g$. I thus provide a ready means of renewing the slots $c\ c$ when unduly worn, without reconstructing ring $g$, as well as insure greater durability in the slots.

With the mechanism thus far described it is evident that the movement of the ring $g$ in either direction will clutch it to both of the disks $d\ d'$, and drive the disks equally either way. It is further evident that if either of the disks $d\ d'$ be revolved in the same direction as the ring $g$, and faster, the balls $b$ will clutch it to the ring as soon as it has moved forward the breadth of a slot $c$. To prevent this latter action of the balls I employ the following mechanism: Around both disks $d\ d'$ at their line of division I place the governor-ring R, so adjusted as to embrace the disks with a running fit, and leave a slight space all around and between it and outer ring, $g$. Through this ring R is driven transversely pins $p\ p'$, which project outwardly on each side nearly to the side plates, $h\ h$, into the slots $c\ c$, two pins entering each slot. These pins are just so far apart that when ring R is turned in one direction until the pins $p$ come against the shoulders of slots $c$ on that side, the pins $p'$ will prevent the balls $b$ from clutching the ring $g$ to disk $d$ or $d'$ on the opposite side of the slots, and vice versa. In this position the shoulders of slots $c$ carry the governor-ring forward with ring $g$ in either direction.

Let us now suppose that the ring $g$ is revolved in the direction of the arrow in Fig. 1. The first movement will bring the parts into the position shown in the figure, around each disk $d\ d'$, because governor-ring R and disks $d\ d'$ will stand still until the pins $p\ p$ come against the shoulders of slots $c\ c$, as shown. Further motion of the ring $g$ in the same direction will cause the balls to drop into the wedge-shaped spaces on the side of pins $p$ and clutch the disks $d\ d'$ to ring $g$ and carry them with the latter. The parts should so adapt themselves to each other that the balls will clutch the disks just before they touch pins $p\ p$. If, now, one of the disks $d$ or $d'$ race ahead of ring $g$, the pins $p'\ p'$ on that side of the governor-ring will prevent the balls from binding it to ring $g$, and allow it perfect freedom of movement. By reversing the motion of ring $g$, pins $p'\ p'$ will be brought against the shoulders of slots $c\ c$ on their side, and pins $p\ p$ on the other side of the balls will perform the same functions as pins $p'\ p'$ did in the first instance. Thus we have an automatic double-acting friction-clutch which will drive the wheels of a tricycle equally well backward or forward and allow one wheel to race or run independently in turning corners, &c.

Instead of balls, other suitably-shaped clutching devices—as rollers or cams—may be employed.

It is evident that the disks $d\ d'$ merely serve as convenient enlargements of the surfaces of shafts $s\ s'$ for the balls $b\ b$ to take a bearing upon, and that they could be dispensed with or reduced in size, and the balls made to bear directly upon the circumference of the shafts. It is also evident that one of the sets of balls may be omitted and the side casing, $h$, attached directly to the shaft on that side, thus allowing the other portion of the shaft alone to be operated by the clutch and governor mechanism.

I am aware that a differential-gear mechanism has been heretofore known having two beveled disks mounted on the ends of a divided vehicle-shaft face to face, with their beveled portions forming a V-groove between them, in which a single set of balls run and are clutched or gripped by an outer ring, driving the disks by the outward pressure against their faces each way from the line of division of the shaft. I make no claim to such device, which my present invention differs from in having a separately-acting clutch mechanism between the outer ring and each of the disks on the end of the divided shaft, and also in allowing either member of the divided shaft to be released from the pressure of the clutch-grip when it races ahead, which is not the case with the former mechanism.

What I claim as new and of my invention is—

1. The combination of the divided shaft $s\ s'$, provided with suitable clutch-bearing surfaces, the independent sets of balls $b\ b$, arranged opposite to and around each portion of the shaft, and the common ring $g$, surrounding both shafts and provided with oppositely-inclined cam-shaped surfaces adapted to engage with said balls and drive said divided shaft in either direction, substantially as described.

2. The combination of the divided shaft $s\ s'$, provided with suitable clutch-bearing surfaces, the independent sets of balls $b\ b$, arranged opposite to and around each portion of the shaft, the governor-ring R, provided with two or more pins or projections, $p\ p'$, and the driving-ring $g$, provided with two or more cam-shaped surfaces corresponding with said pins—that is to say, the cam-shaped surfaces corresponding to pins $p$ being inclined in one direction and the cam-shaped surfaces corresponding to pins $p'$ being inclined in the opposite direction—substantially as described.

3. The combination of the divided shaft $s\ s'$, provided with suitable clutch-bearing surfaces, the independent sets of balls $b\ b$, arranged opposite to and around each portion of the divided shaft, the governor-ring R, provided with two or more pins or projections, $p\ p'$, and the driving-ring $g$, provided with one or more double cam-shaped slots, $c$, corresponding to and receiving said balls and pins, substantially as described.

4. The combination of divided shaft $s\ s'$, driving-ring $g$, an automatic friction-clutch mechanism between said shaft and ring adapted to clutch the latter to one or both portions of said divided shaft when revolved either way, and an automatic governor mechanism operating upon said clutch and adapted to allow the division or divisions of said shaft operated on by it to race ahead of said driving-ring and in the same direction of revolution, substantially as described.

5. The combination of shaft $s'$, provided with a clutch-bearing surface, one or more balls, $b$, arranged around and upon said surface, the automatic governor-ring R, provided with two or more pins or projections, $p\ p'$, adapted to be alternately brought against said ball or balls to control its movements with said shaft-bearing surface, and the driving-ring $g$, provided with one or more double cam-shaped slots, $c$, within which said balls are located, substantially as described.

6. The combination of shaft $s'$, provided with a clutch-bearing surface, balls $b\ b$, arranged around and upon said surface, the automatic governor-ring R, provided with pins or projections $p\ p'$, and the driving-ring $g$, provided with two or more cam-shaped surfaces corresponding to said pins—that is to say, each cam-shaped surface corresponding to a pin $p$ being inclined in one direction and each corresponding to a pin $p'$ being inclined in the opposite direction—substantially as described.

7. The combination of divided shafts $s\ s'$, each division being provided with an enlargement, $d\ d'$, the balls $b\ b$, the automatic governor-ring R, provided with pins $p\ p'$, governing the movements of said balls, and the driving-ring $g$, provided with cam-shaped slots $c\ c$, adapted to bear upon said balls and clutch said ring and members of the divided shaft together, substantially as described.

8. The combination of shaft-section $s$, provided with a clutch-bearing surface, driving-ring $g$, provided with one or more inclined surfaces forming wedge-shaped spaces with relation to such shaft-surface, one or more balls, $b$, between said shaft-surface and said ring, adapted to fall into said wedge-shaped space or spaces and clutch said shaft and ring $g$ together, and automatic governor-ring R, provided with one or more pins projecting into said wedge-shaped space or spaces and adapted to move from and toward the widest end thereof and permit or prevent the ball or balls from falling into the same, substantially as described.

9. The combination of the divided shaft $s\ s'$, a single driving-ring, $g$, surrounding the same, and two independent friction-clutch mechanisms, respectively connecting the shaft-sections $s\ s'$ separately to said driving-ring, substantially as described.

10. The combination of divided shaft $s\ s'$, provided with clutch-bearing surfaces, two or more balls, $b\ b$, and the outer single driving-ring, $g$, having one or more slots, $c\ c$, formed in separate segments or collars V V', of hardened metal, constituting a unitary structure with ring $g$ when secured in operative position therewith, substantially as described.

11. The combination of shaft-section $s'$, disk $d'$, automatic governor-ring R, provided with two or more pins, $p\ p'$, driving-ring $g$, provided with one or more slots, $c$, and one or more balls, $b$, located in said slot or slots and between said pins, substantially as described.

12. The combination of two shaft-sections, $s\ s'$, provided with disks $d\ d'$, governor-ring R, provided with two or more pins, $p\ p'$, projecting transversely on each side of it, driving-ring $g$, provided with one or more slots, $c$, outside of each shaft-section, and two or more balls, $b\ b$, located in said slots and between said pins, substantially as described.

DAVID HALL RICE.

Witnesses:
WILLIAM P. BLAKE,
N. P. OCKINGTON.